C. E. BALLOU.
INSULATED RAIL JOINT.
APPLICATION FILED JUNE 15, 1916.

1,215,897. Patented Feb. 13, 1917.

Charles E. Ballou, INVENTOR

WITNESSES
Jas. K. McCathran
F. T. Chapman

BY
ATTORNEYS

UNITED STATES PATENT OFFICE.

CHARLES E. BALLOU, OF ROANOKE, VIRGINIA, ASSIGNOR TO BALLOU SAFETY RAIL JOINT AND NUT COMPANY, OF ROANOKE, VIRGINIA, A CORPORATION OF DELAWARE.

INSULATED RAIL-JOINT.

1,215,897.  Specification of Letters Patent. Patented Feb. 13, 1917.

Application filed June 15, 1916. Serial No. 103,780.

*To all whom it may concern:*

Be it known that I, CHARLES E. BALLOU, a citizen of the United States, residing at Roanoke, in the county of Roanoke and State of Virginia, have invented certain new and useful Improvements in Insulated Rail-Joints, of which the following is a specification.

This invention has reference to rail joints and particularly to joints designed to be used in connection with rails carrying electric currents, and the object of the invention is to provide a particularly efficient structure for insulating the rails at the joints.

In accordance with the present invention fish plates are employed to span the rail joint and in connection with each fish plate there is a filler bar through which, as well as the fish plates, fastening bolts are passed. These fastening bolts, however, are of particular construction and for best results are needful to insure lasting qualities of the insulated joint.

The invention will be best understood from a consideration of the following detailed description, taken in connection with the accompanying drawings forming part of this specification, with the further understanding that while the drawings show a practical form of the invention, the latter is not confined to any strict conformity with the showing of the drawings, but may be changed and modified so long as such changes and modifications come within the scope of the appended claims.

In the drawings:—

Figure 1:
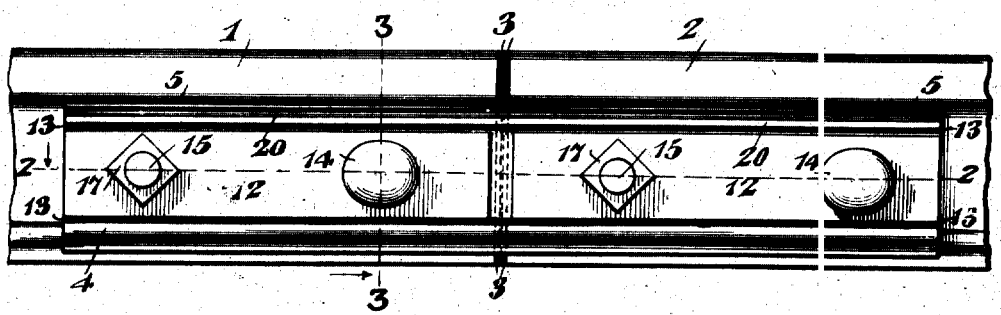
Figure 1 is an elevation of an insulated rail joint constructed in accordance with the present invention.
Figure 2:
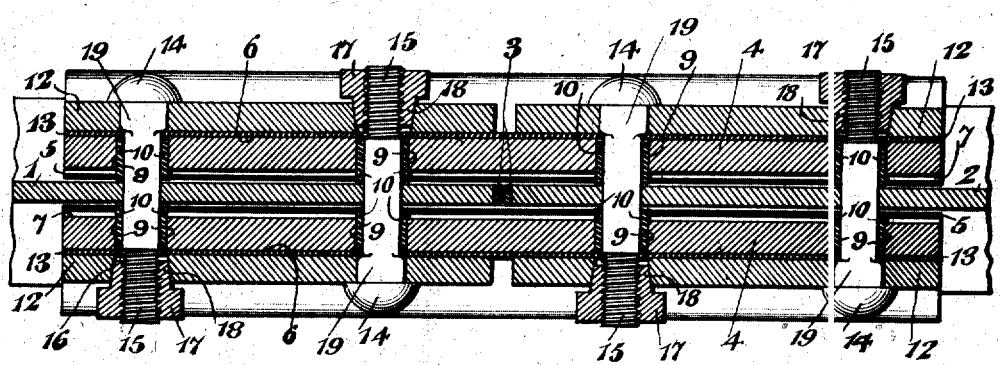
Fig. 2 is a section on the line 2—2 of Fig. 1.
Figure 3:
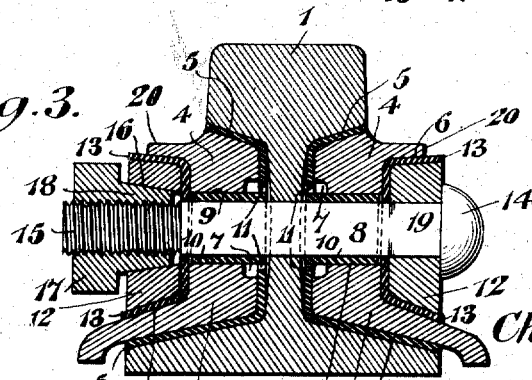
Fig. 3 is a section on the line 3—3 of Fig. 1.

Referring to the drawings there are shown the meeting ends of two rails 1 and 2, respectively, these rails being of the ordinary type employed in railroads. The meeting ends of the rails are separated by sheets 3 of insulating material so that the rails may not come into end to end electrical contact.

The ends of the two rails 1 and 2 are joined by fish plates 4 which, however, differ somewhat from fish plates as ordinarily constructed, being of a height somewhat less than the distance between the flange and under face of the tread of the rail, so that sheets 5 of insulating material may be interposed between those faces of the fish plates next to the rail and the rail itself including the flange, web and tread of the rail. Each fish plate is formed along its outer face with a longitudinal groove 6 and along its inner face with a longitudinal groove 7 and the fish plates and rails are traversed by bolts, for which purpose the fish plates have transverse holes 9 therethrough sufficiently larger than the shanks of the bolts to admit the passage of sleeves 10 of insulating material long enough to reach from the web of the respective rail to the groove or channel 6 in the outer face of the fish plate, and each sheet 5 of insulating material has a perforation 11 suitably situated to permit the inner end of the corresponding sleeve 10 to enter it. Seated in each groove 6 are filler bars 12 of such width and thickness as to permit the introduction of a sheet 13 of insulating material between the filler bar and the walls of the groove 6 of the fish plate 4. The filler bars are individual to the respective rail ends 1 and 2, that is, they do not span the meeting ends of the rails, and are there appropriately separated so that there can be no electrical contact between the adjacent ends of the filler bars. The bolts 8 have heads 14 at one end and elongated threaded portions 15 at the other end and are long enough to traverse not only the rail web and fish plates, but the filler bars as well, with the heads 14 engaging the outer faces of respective filler bars and the threaded ends 15 projecting beyond the outer faces of the opposite filler bars. Following the customary practice the bolts, of which there are usually four, although more may be used, have alternate ones with the heads on one side of the rails and the threaded ends on the other side of the rails, thus in the case of four bolts, two heads will appear on one side of the rails and two heads will appear on the other side of the rails. The filler bars where traversed by the threaded ends of the bolts have tapering passages 16, while the bolts are provided with nuts 17 having axially extended tapering shanks 18 adapted to the tapering passages 16. Each bolt has the portion of the shank adjacent to the head 14 and indicated in the drawings at 19, of non-circular shape, while the holes in the filler bars traversed by the portions 19 of the shanks are similarly shaped, so that the bolts will not turn when the nuts 17 are screwed up. By forming the stems or shanks 18 of the nuts with a relatively long or small angle taper they enter tightly and securely into the corresponding taper passages 16 of the filler bars and when once screwed up are unyielding to various forces tending to loosen the nuts, this having been proven by long experience. The result is that with bolts as shown and described there is no liability at all of loosening of the parts, after being once assembled, due to any of the shocks and jars which may occur in railroad traffic, wherefore there is no movement of the metal parts upon the insulation and the latter does not become worn or otherwise injured, even after long lapses of time.

The fish plates are insulated along their full length, by the insulating sheets 5, from the rails. The filler bars 12 are insulated along the full length of each from the fish plates by the insulating sheets 13. The bolts are not insulated from the filler bars, but are insulated from the fish plates by the sleeves 9. Moreover, the bolts are not insulated from the rails. However, the rails being insulated one from the other at the meeting ends and from the fish plates, and the filler bars being insulated from each other, the two rails are also insulated one from the other at all points where there is liability of a circuit being established between the rails. At the same time the rails are so firmly united that there can be no creeping with respect to the fish plates and rails, or rails and bolts, or bolts and filler bars, so that the insulation is at no point subjected to rubbing forces and consequently maintains its efficiency indefinitely.

The filler bars 12 and the grooves 6 taper in such manner that the filler bars wedge into the grooves when seated by the bolts and this further produces a tight fit and eliminates all frictional wear beside keeping out any water which may reach the joint. The fish plates also taper toward the web of the rail and the sheets 5 of insulating material are correspondingly tightly wedged in place. To prevent any possibility of the flanges of the wheels running on the tracks 1 and 2 from engaging the fish plates, which outstand considerably from the treads of the rails, and to a greater extent than customary, these outstanding portions, indicated at 20, are sufficiently lower than the level of the bottoms of the rail treads so that when the treads of the rails wear the flanges of the wheels will still clear the outstanding portions 20 of the fish plates.

The particular thickness and width of the fish plates and their parts may vary in accordance with the size of joint. The insulation may be actually continuous from end to end or may be sectional, that is, in one or more pieces, while the thickness will depend upon the conditions to be met.

One great advantage of the present invention is that the insulation is complete and will remain complete and tight, the same as though no insulation at all were used. The taper-shank nut is of importance in that it insures the stability of the parts because the nuts do not loosen under traffic conditions, although readily tightened or loosened by a purposely applied force.

The filler bars are duplicates and so may be used on either side of the joint, while the bolts having their head ends so seated in the filler bars as to be there non-rotatable do not have to be held while the nuts are turned with a wrench, as is now done in most insulated joints, and has much to do with keeping the joint tight or tightening it should it become loose from any cause.

What is claimed is:—

1. An insulated rail joint, comprising fish plates each of a length corresponding to the length of the joint with each fish plate having a longitudinal groove in its outer face, a filler bar adapted to each groove, insulating material between each fish plate and rail and between each filler bar and fish plate, and bolts traversing the filler bars and fish plates and the webs of the rails.

2. An insulated rail joint, comprising fish plates each of a length corresponding to the length of the joint with each fish plate having a longitudinal groove in its outer face, a filler bar adapted to each groove, insulating material between each fish plate and rail and between each filler bar and fish plate, and bolts traversing the filler bars and fish plates and the webs of the rails, each bolt having a nut with an axially extended taper shank and each filler bar where traversed by the end of the bolt to which the nut is applied having a taper hole adapted to receive the taper shank of the nut.

3. An insulated rail joint, comprising fish plates each of a length corresponding to the length of the joint with each fish plate having a longitudinal groove in its outer face, a filler bar adapted to each groove, insulating material between the fish plate and rail and between the filler bar and fish plate, and bolts traversing the filler bars and fish plates and the webs of the rails, each bolt having a nut with an axially extended taper shank and each filler bar where traversed by the end of the bolt to which the nut is applied having a taper hole adapted to receive the taper shank of the nut, and each bolt having the head end of non-circular contour with the filler plate where traversed by the non-rotatable portion of the bolt similarly shaped to prevent rotation of the bolt.

4. A rail joint having fish plates corresponding in length to the joint and of a thickness to extend beyond the outer edges of the treads of the rails, each fish plate having a longitudinal groove in its outer face tapering toward the bottom of the groove and of a length corresponding to the length of the fish plate, filler bars adapted to the grooves in the fish plates and correspondingly tapering in cross-section to the taper of the grooves, the filler bars being individual to the respective rails and separated at their adjacent ends, insulation between the meeting ends of the rails, between the fish plates and the rails, and between the filler bars and the fish plates, and bolts traversing the filler bars, fish plates and the webs of the rails and insulated from the fish plates.

5. A rail joint having fish plates corresponding in length to the joint and of a thickness to extend beyond the outer edges of the treads of the rails, each fish plate having a longitudinal groove in its outer face tapering toward the bottom of the groove and of a length corresponding to the length of the fish plate, filler bars adapted to the grooves in the fish plates and correspondingly tapering in cross-section to the taper of the grooves. the filler bars being individual to the respective rails and separated at their adjacent ends, insulation between the meeting ends of the rails, between the fish plates and the rails and between the filler bars and the fish plates, and bolts traversing the filler bars, fish plates and webs of the rails and insulated from the fish plates, said bolts having head ends of non-rotatable contour with the filler bars where traversed thereby of corresponding shape and the nut receiving ends of the bolts having nuts therefor with taper axially extended shanks and the filler bars where traversed thereby having corresponding taper holes.

6. An insulated rail joint for the meeting ends of railway rails comprising fish plates spanning the meeting ends of the rails and insulated therefrom, filler bars seated in the outer faces of the fish plates and each of a length to be individual to a respective rail, and bolts traversing the filler bars, fish plates and webs of the rails for connecting them together, the rails being in insulated relation at their meeting ends, the fish plates being insulated from the rails and bolts and the filler bars being insulated from the fish plates and in insulated relation at their adjacent ends.

In testimony whereof I have affixed my signature in the presence of two witnesses.

CHARLES E. BALLOU.

Witnesses:
ERNEST H. JENNINGS,
HETTIE M. WHITLOW